Patented May 30, 1939

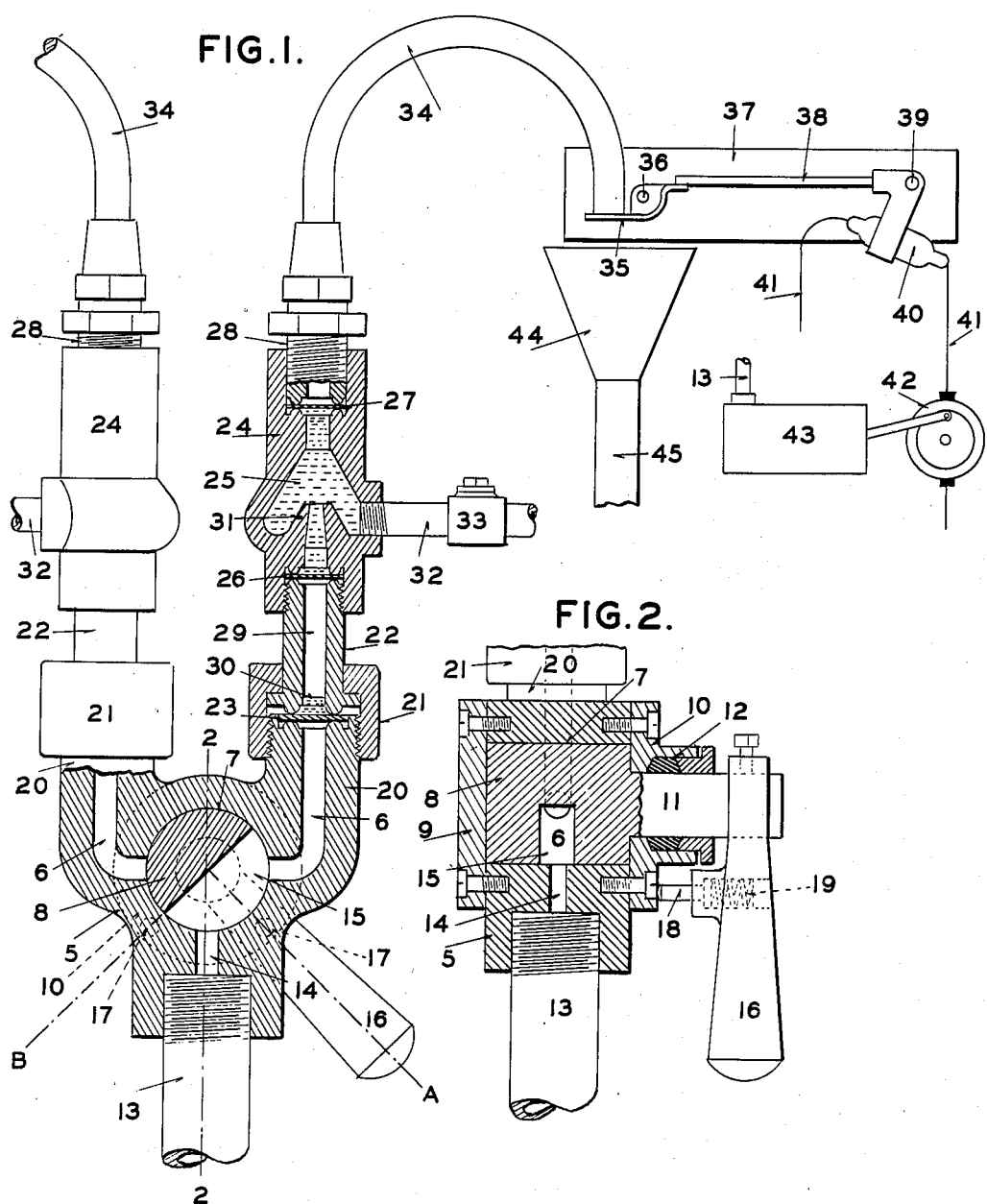

2,160,137

UNITED STATES PATENT OFFICE 2,160,137

SAFETY MECHANISM

Albert F. Froussard, St. Louis, Mo.

Application January 18, 1937, Serial No. 121,139

2 Claims. (Cl. 137—111)

My invention relates to a safety mechanism for relieving excess pressure, and in the specific form shown and described is particularly adapted for use in connection with an ammonia compressor or the like.

One object of my invention is to provide means for discharging the gas into a mixing chamber when the safety device relieves the pressure, so that the gas is absorbed by water and prevented from escaping into the atmosphere.

Another object of my invention is to provide an air chamber adjacent the safety device, whereby access of water to the valve is prevented so as to avoid corrosion or fouling of the device which would interfere with the reliability of its action.

Still another object of my invention is to provide a duplex safety device cooperating with a by-pass valve by means of which one or the other of the elements of the safety device may be placed in communication with the source of pressure to render the operation of the device substantially continuous.

In the accompanying drawing, which illustrates one form of safety mechanism made in accordance with my invention, Figure 1 is a side view, partly in section and partly in elevation; and Figure 2 is a section taken on the line 2—2 of Figure 1, the by-pass valve being shown in the central position.

The device comprises a by-pass valve casing 5 and a pair of similar safety units communicating therewith through ports 6. The valve casing 5 has a transverse cylindrical opening 7 in which is located a by-pass valve 8 of the plug type. The ends of the opening 7 are closed by plates 9 and 10 the latter of which is provided with an opening for the passage of valve stem 11 and carries a packing gland 12 to prevent the escape of fluid. Threaded or otherwise secured in the casing 5 is a pipe 13 communicating with the ammonia compressor, diagrammatically shown, or other source of fluid pressure. Pipe 13 communicates with the opening 7 through a port 14. Formed in valve 8 is a slot 15 forming a port to place port 14 in communication with one or the other of the ports 6. The valve is moved by means of a handle 16 secured to the stem 11. When the handle is in its extreme right-hand position lying along line A, port 14 will communicate with port 6 of the right-hand safety unit, but when in its extreme left-hand position lying along line B, port 14 will be in communication with port 6 of the left-hand safety unit. When the handle is in its medial position, as shown in Figure 2, port 14 will be in communication with both of the ports 6. To retain the handle in one or the other of its extreme positions some part of the casing, preferably the end plate 10, is provided with a pair of recesses 17 adapted to be engaged by the rounded end of a pin 18 carried in the handle and biased toward the valve by a spring 19.

Each side of the casing 5 is provided with a threaded boss 20 engaged by a union 21, which union serves to clamp a nipple 22 against a main safety device 23, of the rupturable disk type, interposed between the ends of the boss and nipple. The upper end of the nipple is threaded and engages with a sleeve 24 in which is formed a water or mixing chamber 25. Interposed between the nipple and sleeve is a rupturable disk 26 and a similar disk 27 is interposed between the sleeve and a plug 28. The disks 26 and 27 are of very thin metal providing just sufficient resistance to overcome the pressure of the water in chamber 25, for example 50 pounds, while disk 23 is considerably thicker as it must overcome the full working pressure of the compressor, for example 250 pounds. The nipple forms an air chamber 29 separating disk 23 from the water so that the water pressure will not affect the resistance of the disk. This separation of the water chamber from the disk also prevents corrosion of the disk and the deposition thereon of scale or other impurities from the water. To further protect the disk from corrosion, a small quantity of oil 30 may be placed in the lower end of the air chamber. The water chamber is provided with an injector nozzle 31 and is supplied through a pipe 32 in which is a check valve 33 to prevent water from being forced back in the pipe by the pressure of gas when the disks are ruptured.

Leading from plug 28 is a pipe 34 the end of which is covered by a trip plate 35 pivoted at 36 to a support 37. The trip plate operates a bell-crank lever 38 pivoted to the support 37 at 39. The bell-crank lever carries a mercury switch 40 to make or brake a circuit 41. This circuit may be connected to an alarm, in which case the circuit will be made by movement of the bell-crank lever. I prefer, however, to utilize the switch to control the circuit to motor 42 which drives the compressor 43. This motor and compressor are diagrammatically shown in Figure 1. In this case it will be understood that the switch functions to brake the circuit and thus shut off the machine. Pipe 34 discharges into a funnel 44 connected to waste pipe 45.

The operation of my device is as follows: The by-pass valve being in the position shown in Figure 1, the compressor will be in communication with the right-hand safety unit. In case the pressure in the compressor rises above the safe load, disk 23 will be ruptured. This will be immediately followed by the rupture of the thinner secondary disks 26 and 27. The gas now passes up through the water chamber carrying the water with it into pipe 34. The gas is absorbed by the water and discharged with it into the waste pipe. The users of the system are thus adequately protected against the disagreeable and dangerous effects of the ammonia gas. The operator will be immediately apprised of this condition either by the sounding of an alarm or the stoppage of the motor. He can now move the handle 16 to the position indicated by broken line B and again place the apparatus in operative position and replace the ruptured disks.

While I have shown, and prefer to use, safety devices of the rupturable disk type, I may, if found desirable, employ safety devices of the spring loaded valve type.

Having fully described my invention, what I claim as new and desire to secure by Letters Patent of the United States is:

1. In a device of the class described containing a conduit, a main frangible element closing said conduit, and a pair of spaced auxiliary frangible elements also closing said conduit, said latter named frangible elements defining a water mixing chamber spaced from the main element.

2. In a device of the class described comprising a conduit, of primary means in said conduit preventing the passage of fluid below a predetermined pressure, and a pair of secondary means in said conduit preventing the passage of fluid below a predetermined pressure, said secondary means defining a water mixing chamber spaced from the main means.

ALBERT F. FROUSSARD.